United States Patent
Pusdesris et al.

(10) Patent No.: US 11,334,495 B2
(45) Date of Patent: May 17, 2022

(54) CACHE EVICTION

(71) Applicant: Arm Limited, Cambridge (GB)

(72) Inventors: Joseph Michael Pusdesris, Austin, TX (US); Yasuo Ishii, Austin, TX (US)

(73) Assignee: Arm Limited, Cambridge (GB)

( * ) Notice: Subject to any disclaimer, the term of this patent is extended or adjusted under 35 U.S.C. 154(b) by 139 days.

(21) Appl. No.: 16/549,291

(22) Filed: Aug. 23, 2019

(65) Prior Publication Data
US 2021/0056034 A1 Feb. 25, 2021

(51) Int. Cl.
*G06F 12/0891* (2016.01)
*G06F 12/0875* (2016.01)
*G06F 9/30* (2018.01)

(52) U.S. Cl.
CPC ...... *G06F 12/0891* (2013.01); *G06F 9/30058* (2013.01); *G06F 12/0875* (2013.01)

(58) Field of Classification Search
CPC ............ G06F 12/0891; G06F 9/30058; G06F 12/0875; G06F 9/384; G06F 9/3806; G06F 9/3844; G06F 2212/1032; G06F 2212/1016; G06F 2212/452; G06F 12/0888; G06F 12/0897; G06F 2212/507; G06F 12/128; G06F 2212/1044
See application file for complete search history.

(56) References Cited

U.S. PATENT DOCUMENTS

| | | | | |
|---|---|---|---|---|
| 6,725,337 B1* | 4/2004 | Tan | ..................... | G06F 12/0891 711/133 |
| 10,394,716 B1* | 8/2019 | Piry | ................... | G06F 12/0871 |
| 10,719,327 B1* | 7/2020 | Al-Otoom | ............. | G06F 9/3848 |
| 2005/0091457 A1* | 4/2005 | Auld | ................... | G06F 12/0897 711/128 |
| 2006/0200655 A1* | 9/2006 | Smith | ................. | G06F 12/0875 712/238 |
| 2008/0147986 A1* | 6/2008 | Chinthamani | ...... | G06F 12/0831 711/141 |
| 2008/0235453 A1* | 9/2008 | Emma | ................... | G06F 12/127 711/122 |
| 2010/0235579 A1* | 9/2010 | Biles | ..................... | G06F 12/127 711/125 |
| 2014/0281180 A1* | 9/2014 | Tune | ................... | G06F 12/0864 711/104 |
| 2015/0293854 A1* | 10/2015 | Kalamatianos | .... | G11C 29/4401 714/723 |
| 2015/0363322 A1* | 12/2015 | Howes | ................ | G06F 12/0897 711/144 |
| 2016/0283380 A1* | 9/2016 | Vinod | ................. | G06F 12/0811 |
| 2016/0328320 A1* | 11/2016 | Dooley | ............. | G06F 12/0895 |
| 2017/0090935 A1* | 3/2017 | Falsafi | ............... | G06F 12/0875 |
| 2017/0161095 A1* | 6/2017 | Horsnell | ............ | G06F 12/0891 |

(Continued)

*Primary Examiner* — Francisco A Grullon
(74) *Attorney, Agent, or Firm* — Nixon & Vanderhye P.C.

(57) ABSTRACT

A data processing apparatus is provided. It includes cache circuitry to store a plurality of items, each having an associated indicator. Processing circuitry executes instructions using at least some of the plurality of items. Fill circuitry inserts a new item into the cache circuitry. Eviction circuitry determines which of the plurality of items is to be a victim item based on the indicator, and evicts the victim item from the cache circuitry. Detection circuitry detects a state of the processing circuitry at a time that the new item is inserted into the cache circuitry, and sets the indicator in dependence on the state.

12 Claims, 5 Drawing Sheets

(56) References Cited

U.S. PATENT DOCUMENTS

| | | | |
|---|---|---|---|
| 2018/0227382 A1* | 8/2018 | Mannava | G06F 12/0831 |
| 2019/0138458 A1* | 5/2019 | Engh-Halstvedt | G06F 12/1045 |
| 2019/0205140 A1* | 7/2019 | Grisenthwaite | G06F 21/71 |
| 2019/0377677 A1* | 12/2019 | Kamikubo | G06F 12/1441 |
| 2020/0104137 A1* | 4/2020 | Natarajan | G06F 9/3848 |

* cited by examiner

| 310 | 320 | 330 | 340 | |
|---|---|---|---|---|
| State | tag | data | Candidate | |
| V | PC | ADD  LD  ST  SUB | 1 | } 350 |
| V | PC2 | SUB  MUL  B  LD | 0 | } 360 |

300

FIG. 4

CACHE EVICTION

TECHNICAL FIELD

The present disclosure relates to data processing. More particularly, it relates to caches.

DESCRIPTION

In a data processing apparatus, a cache may be used to store data or instructions fetched from memory such as a DRAM so that the data or instructions can be accessed quickly. Such caches are typically fast at least in part due to their limited size as compared to main memory. However, the limited size of such caches means that cache lines must be evicted to make room for newer cache lines. This can often involve the removal of useful cache lines from the caches. This is undesirable, because the relevant information (data or instructions) may have to be fetched again and reinserted into the cache. It is therefore desirable to make good use of the cache's limited capacity.

SUMMARY

Viewed from a first example configuration, there is provided a data processing apparatus comprising: cache circuitry to store a plurality of items, each having an associated indicator; processing circuitry to execute instructions using at least some of the plurality of items; fill circuitry to insert a new item into the cache circuitry; eviction circuitry to determine which of the plurality of items is to be a victim item based on the indicator, and to evict the victim item from the cache circuitry; and detection circuitry to detect a state of the processing circuitry at a time that the new item is inserted into the cache circuitry, and to set the indicator in dependence on the state.

Viewed from a second example configuration, there is provided storing a plurality of items in a cache circuitry, each having an associated indicator; executing instructions on processing circuitry using at least some of the plurality of items; inserting a new item into the cache circuitry; determining which of the plurality of items is to be a victim item based on the indicator; evicting the victim item from the cache circuitry; detecting a state of the processing circuitry at a time that the new item is inserted into the cache circuitry; and setting the indicator in dependence on the state.

Viewed from a third example configuration, there is provided a data processing apparatus comprising: means for storing a plurality of items, each having an associated indicator; means for executing instructions using at least some of the plurality of items; means for inserting a new item into the means for storing; means for determining which of the plurality of items is to be a victim item based on the indicator; means for evicting the victim item from the cache circuitry; means for detecting a state of the means for executing instructions at a time that the new item is inserted into the means for storing; and means for setting the indicator in dependence on the state.

BRIEF DESCRIPTION OF THE DRAWINGS

The present invention will be described further, by way of example only, with reference to embodiments thereof as illustrated in the accompanying drawings, in which:

FIG. 4 illustrates an apparatus for use with branch predication in accordance with some embodiments.

DESCRIPTION OF EXAMPLE EMBODIMENTS

Figure 1:
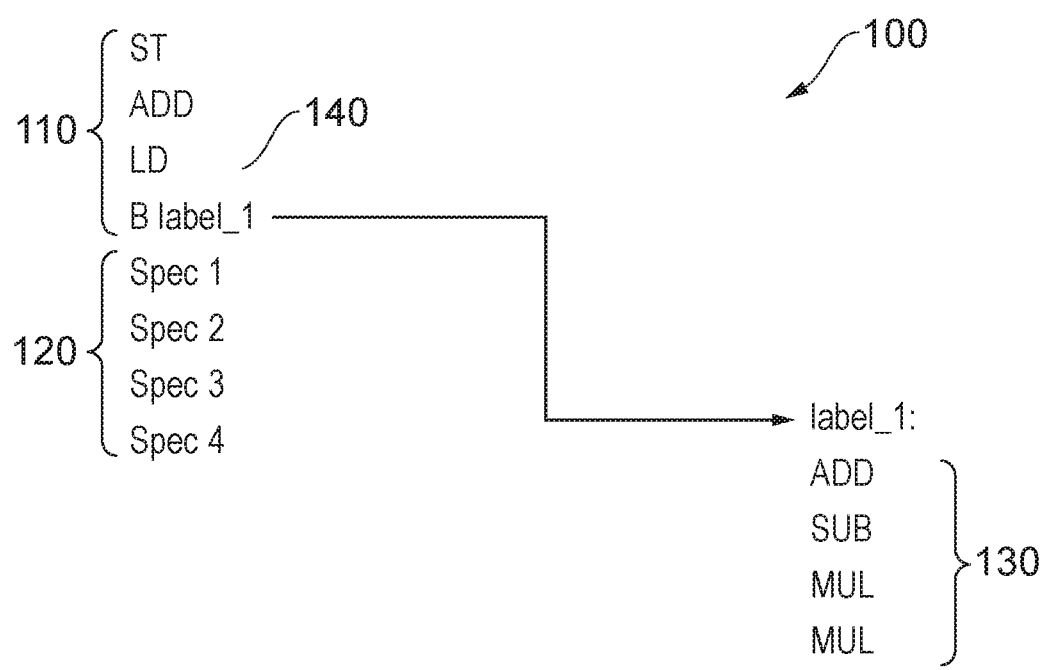
FIG. 1 illustrates a process that may be used with the present technique in accordance with some embodiments.

Before discussing the embodiments with reference to the accompanying figures, the following description of embodiments is provided.

In accordance with one example configuration there is provided a data processing apparatus comprising: cache circuitry to store a plurality of items, each having an associated indicator; processing circuitry to execute instructions using at least some of the plurality of items; fill circuitry to insert a new item into the cache circuitry; eviction circuitry to determine which of the plurality of items is to be a victim item based on the indicator, and to evict the victim item from the cache circuitry; and detection circuitry to detect a state of the processing circuitry at a time that the new item is inserted into the cache circuitry, and to set the indicator in dependence on the state.

In the above example, it is possible to indicate entries in the cache that may be turn out to be unnecessary or unused. In particular, as entries are stored in the cache, they are stored with an indicator. The indicator provides an indication of a state of the processing circuit at the time the item is inserted into the cache. In this way, when it comes time to evict a victim from the cache, a decision can be made based on the indicator (i.e. based on the state of the processing circuitry at the time each item was added to the cache). The state of the processing circuitry may be used to give guidance as to how likely it is that the cached item will be (validly) used by the processing circuitry in the near future. Consequently, eviction of the limited entries of the cache can be targeted to those entries that are least likely to be useful. Note that the setting of the indicator could be equated with the use of a bit '1' or a bit '0' in the appropriate field.

In some examples, the data processing apparatus comprises clearing circuitry to detect a condition and in response to the condition, to clear the indicator for a cleared item in the items. The clearing circuitry can therefore be used to clear the indicator for a cleared item in the items stored in the cache circuitry if and when it is determined that a particular condition is met. The condition could correspond with a requirement that indicates the particular item to be cleared is likely to be of use and therefore that the indication should no longer apply. In this way, an item inserted into the cache can initially be flagged as being of no use until some condition is met. In some examples, this initial flagging is performed when some other conditions are met. For instance, suspected low-value items can be initially flagged and cleared at a later time if they turn out to be useful. In these embodiments, clearing corresponds with the setting of either a '0' or '1' in the relevant field (i.e. the opposite operation to setting the indicator).

In some examples, the processing circuitry is adapted to execute at least some of the instructions speculatively; and the state of the processing circuitry comprises a speculation state of the processing circuitry. Speculative execution is a technique in which one or more instructions may be executed before it is known whether those instructions should be executed or not. This helps to avoid a 'stall' in which execution must pause until it is determined whether the instructions should be executed. If speculation occurs incorrectly—a so called "miss-speculation" then the state of the processing circuitry can be undone or "rewound". In these examples, the state of the processing circuitry considers the speculation state of a processing circuitry. This recognises the fact that when speculation occurs, there is a possibility that a rewind might occur and so instructions/data that were fetched for speculative operations might end up being unused after the rewind occurs. By recognising this situation, it is possible to encourage eviction for those items in the cache that have been fetched as a result of miss-speculation. This therefore encourages eviction to take place on these items.

In some examples, the data processing apparatus comprises prediction circuitry to perform a branch lookup in respect of a branch instruction in the instructions, wherein the speculation state is dependent on the branch lookup. One form of speculation that can occur is branch prediction. In particular, the existence of a branch instruction, the direction of any branch instruction, and the outcome of a branch instruction (e.g. the direction) may not be known until the instructions in a block of instructions are executed. However, waiting for the instructions to execute will result in a 'stall', since other instructions cannot be fetched or executed until such time as the outcome of the branch is determined. To resolve this, speculation is used so that a prediction is made regarding the direction or target of a branch instruction (the lack of any target prediction also predicts the lack of branch instruction in the block of instructions). Appropriate instructions are then fetched, decoded, executed, etc. until such time as the predictions can be resolved. For instance, if there is a prediction that there is no branch instruction (e.g. if the block of instructions has not been seen before) or if it is predicted that the branch will not be followed, then the following block of memory will be fetched and treated as the next set of instructions to be fetched, decoded, executed, etc. If it is determined that the prediction was correct, then no loss in processing occurs. If, however, it is determined that the prediction was incorrect, then the instructions that were mistakenly executed are "rewound" and the correct path is followed. However, it will be appreciated that in this situation, there is no significant loss as compared to a situation in which the processing circuitry must wait until the branch instruction is resolved before continuing.

In some examples, the prediction circuitry comprises a branch target buffer; the branch lookup is a branch target lookup in the branch target buffer; and when the branch lookup results in a miss, the speculation state is set to indicate that the at least some of the instructions are to be executed speculatively, and the indicator is set. An indirect branch instruction is a branch instruction for which the target may not be known ahead of time. In particular, this could be because the target is determined as a consequence of a calculation or a further operation that must be executed (such as a memory access instruction). A branch target buffer may be provided in order to assist in the prediction operation for predicting an outcome of the indirect branch instruction. In addition, the branch target buffer may be used to predict the existence of a branch instruction within a block of instructions. For instance, if no target is provided in respect of a block of instructions, then the block of instructions is either unknown to the block target buffer or the block does not contain any branch instructions.

Consequently, when the branch lookup results in a miss, it is speculatively assumed that there is no branch instruction and the following block of memory is fetched and treated as the next set of instructions to execute. However, due to the miss, there is a reasonable chance that this behaviour will be incorrect and that a branch was supposed to have been followed instead.

In some examples, the branch instruction is a conditional branch instruction; the prediction circuitry comprises a branch direction buffer; the branch lookup is a branch direction lookup in the branch direction buffer; and when the branch taken lookup results in a miss, the speculation state is set to indicate that the at least some of the instructions are to be executed speculatively, and the indicator is set. A conditional branch instruction is an instruction in which it is not immediately determined whether the branch will be followed or not. A branch direction buffer may be provided in order to assist in the prediction operation. When the branch taken lookup results in a miss, i.e. there is too little data to make an accurate prediction, there may be a greater than normal chance that the speculation will result in miss-speculation. Consequently, the indicator is set to indicate that eviction should prioritise any items that are fetched as a result of the speculative execution.

In some examples, when the branch direction lookup results in the miss, the processing circuitry is adapted to speculatively disregard the branch. In some examples, the consequence of a miss in the branch direction buffer is for the processing circuitry to disregard the branch so that the speculatively fetched instructions are those instructions following the branch rather than at a target of the branch.

In some examples, the condition comprises a requirement that the at least some of the instructions are speculatively executed twice while the cleared item is stored in the cache circuitry. In such examples, the clearing circuitry clears the indicator for an entry of the cache when an instruction relating to that entry is speculatively executed twice whilst the cleared item is in the cache. Such examples make the assumption that as a consequence of an item in the cache being referenced twice, the item in question is likely to be used. Such a situation could arise, for instance, in a loop in which the same prediction is made twice. Since it may be more likely that a second prediction is accurate as compared to a first prediction due to the accumulated data with which a prediction can be made, the fact that an item in the cache is referenced twice can act as an indicator that the desired item is likely to be used.

In some examples, the condition comprises a requirement that the instructions are executed speculatively correctly. Another situation in which the clearing circuitry may clear the indicator thereby discouraging that item from being evicted from the cache is when it is determined that the item is associated with an instruction whose speculative execution was determined to be correct. In other words that the instruction was not as a result of a miss-speculation. Again, it may be assumed that when an instruction is correctly speculatively executed, any cached item associated with that instruction is used legitimately. In particular, modern day compilers are generally capable of removing "dead code" or code that forms part of a program that serves no purpose.

In some examples, the cache is an instruction cache; and the items comprise the at least some of the instructions. An instruction cache may be used in order to cache instructions that are fetched from memory. By caching the instructions in a cache rather than fetching them from memory when required, the process of decoding and executing the instructions can be sped up. In these examples, the items that are in the cache are the instructions themselves. Consequently, the present technique can be used in these examples to encourage the eviction of instructions from the instruction cache that have a low probability of being used. Consequently, more room can be made in the instruction cache for instructions that are likely to be used.

In some examples, the instructions are deadblock instructions. Deadblock instructions could be considered to be code obtained from memory that was expected to be an instruction, but in practice is something other than an instruction. For example, at a branch instruction, the system may speculatively fetch data stored in an area of memory immediately following the location of the branch instruction in memory. Such a situation may arise if the branch predictor predicts that the branch will not be taken. This might, for instance, be the default behaviour when no data is available to a branch predictor such as the first time that a branch is encountered. However, there is no way for the underlying system to know for certain that the data at those memory locations is in fact a set of instructions. Such data could, instead, be data relating to the execution of the program or another program. The data could even relate to a previous execution of the program or could relate to sensitive data used by the operating system for its execution. In practice, a properly designed program will not cause the control flow of the program to actively interrupt such areas of memory as instructions. However, in the case of a branch predictor, such behaviour may not be guaranteed. Consequently, the system may attempt to execute non-instructions as instructions. Eventually, once the branch instruction is resolved, this should result in the system "rewinding" so that the execution of the non-instructions is undone. However, such items of data have still been treated as instructions and thus may form part of the instruction cache. This therefore causes the capacity of the instruction cache to be used up unnecessarily on non-instructions. The present technique makes it possible for such data to be preferentially chosen for eviction.

In some examples, the cache is a data cache; and the items comprise data used in execution of the instructions. Of course, the present technique is not solely directed towards instruction caches. In particular, the cache could be a data cache containing a number of items of data referenced by instructions that are used by those instructions during their execution. If such data is fetched into the cache as a consequence of miss-speculation, then again these items of data will use up space in the data cache unnecessarily. Indeed, depending on how instructions are interpreted, it is possible that the items of data could be fetched into the data cache as a consequence of deadblock instructions being speculatively executed and interpreted as making reference to particular locations in memory.

Particular embodiments will now be described with reference to the figures.

FIG. 1 illustrates a computer program 100 that may be used with the present technique in accordance with some embodiments. The program 100 can be logically divided into a number of blocks 110, 120, 130. The first block 110 contains a branch instruction 140 to the third block 130. The second block 120 immediately follows on from the branch instruction 140 in the first block 110. Note that each of the blocks 110, 120, 130 may represent a block of instructions that are simultaneously fetched (e.g. from an instruction cache).

During execution of the instructions in the first block of instructions 110, it is determined whether any of the instructions within the block 110 is a branch instruction. If such a branch instruction is found, then further predictions may be made regarding the direction and target of the branch instruction. During this process, or because of the predictions made during this process, the following block of instructions 120 may also be fetched into the instruction cache. Consequently, the second block of instructions 120 is speculatively fetched. In this case, the first block of instructions 110 does contain a branch instruction 140. In particular, in this example, the branch instruction 140 is a conditional branch instruction. In particular, the branch instruction 140 causes a branch to label one on the condition that the zero flag is not set. If the zero flag is set, then the branch is not followed causing the program flow to proceed to the second block of instructions 120. While the condition on this branch instruction 140 is evaluated, the second block of instructions 120 may be speculatively executed.

In any event, at a later time, the evaluation of the first block of instructions 110 will complete—either the determination that there is a branch instruction 140 will be completed, or the condition of the branch instruction 140 will be evaluated. It may therefore turn out that the second block of instructions 120 has been incorrectly executed. Consequently, a "rewind" occurs, which causes the execution of those instructions 120 to be undone. The program flow then proceeds to the correct path to cause the execution of the third block of instructions 130. However, as a consequence of this, the second block of instructions 120 has been fetched into the instruction cache. Furthermore, if any of those instructions have been executed, then this could have caused data values to be fetched into the data cache. This is undesirable, since the presence of these instructions 120 in the instruction cache and the presence of their corresponding data in the data cache may cause the capacity of those caches to be reduced. In particular, it may be more difficult for relevant instructions and data to be stored in the caches dues to the presence of this unused information.

Figure 2:
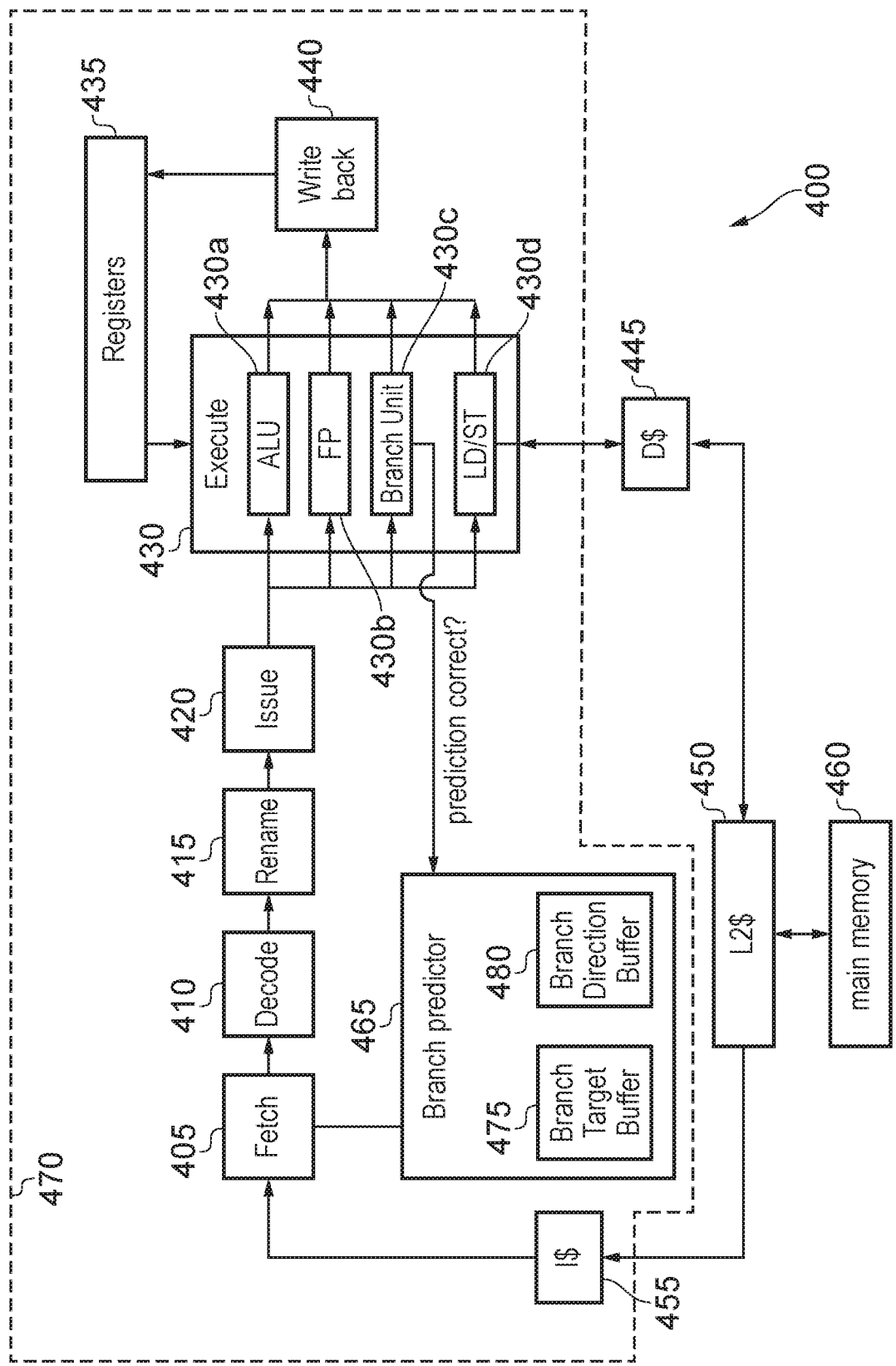
FIG. 2 illustrates a data processing apparatus in accordance with some embodiments.

FIG. 2 illustrates a data processing apparatus 200 in accordance with some embodiments. The data processing apparatus 200 includes a CPU 210 for the execution of instructions. During the execution of the instructions, the state of the CPU 210 may change. This state is detected by detection circuitry 220. The CPU 210 also accesses a cache 230 during execution of the instructions. Here the cache 230 is illustrated as being outside the CPU 210. However, in other examples, the cache 230 could form part of the CPU 210. In any event, in response to a request from the CPU 210 for particular information, the cache 230 determines whether that information is locally stored. If not, then the request is issued to main memory (or to a lower level cache) for the requested information. In response to this request, the requested information is returned and is used by fill circuitry 240 in order to insert the information into the cache 230. The cache also includes eviction circuitry 250. The eviction circuitry 250 is responsible for removing/overwriting an existing entry in the cache 230 in response to receiving a new entry to be stored in the cache when there is not existing capacity within the cache 230. The eviction circuitry 250 therefore selects a victim entry in the cache 230, which is overwritten by the entry handled by the fill circuitry 240. In this way, the cache 230 is able to store a subset of the information stored at the main memory. Since the cache 230 is small and fast, data that is available in the cache 320 can be accessed more quickly than if the data had to be accessed from memory. However, this increased efficiency comes at the cost of limited capacity within the cache 230. Consequently, it is desirable to ensure that information stored within the cache 230 is actively used or is relevant to the current execution of instructions by the CPU 210.

In these embodiments, the eviction circuitry 250 considers the state of the CPU 210. In particular, when an instruction is being executed by the CPU 210 and information is to be stored in the cache 230 in relative to the execution of that instruction, then the detection circuitry's detected state of the CPU 210 is stored in association with that information in the cache 230. The eviction circuitry 250 then makes a decision regarding eviction using this stored information. Consequently, when a decision is to be made regarding the selection of the victim from the cache 230 the state of the CPU 210 can be taken into account. In this way, it is possible to cause the eviction to favour victims that are less likely to be useful to the current execution of instructions by the CPU 210. This therefore makes it possible to restrict the occupancy of the cache 230 to data that is most likely to be useful.

One example of the states that can be detected by the detection circuitry 220 is whether the currently executing instruction is being executed speculatively or not. Such speculative execution could occur, for instance, as a result of a conditional branch instruction or an indirect branch instruction in which the target of the branch must be determined. As previously explained, rather than causing the branch instruction to be evaluated, a prediction is made and execution proceeds on the basis of that prediction in the knowledge that the execution can be "rewound" if the prediction turns out to be incorrect. Clearing circuitry 260 is provided in order to remove the state information that is stored in association with the information in the cache 230 in response to a condition being met. For instance, if the speculation turns out to be correct, then the fact that the instruction was executed speculatively may be removed from the cache 230. Such conditions may be selected in order to represent the situation in which previously unknown data has been proved to be valuable or useful to the current execution of instructions by the CPU 210. For instance, if the speculation has been determined to be correct, then the instructions or data stored in the cache 230 are likely to have value and should be maintained. By removing the indication that the associated instructions were speculatively executed, the eviction circuitry 250 can be discouraged from evicting those entries where possible. In contrast, if the information is not cleared, then the eviction circuitry 250 will select such entries for preference for eviction.

Figure 3:
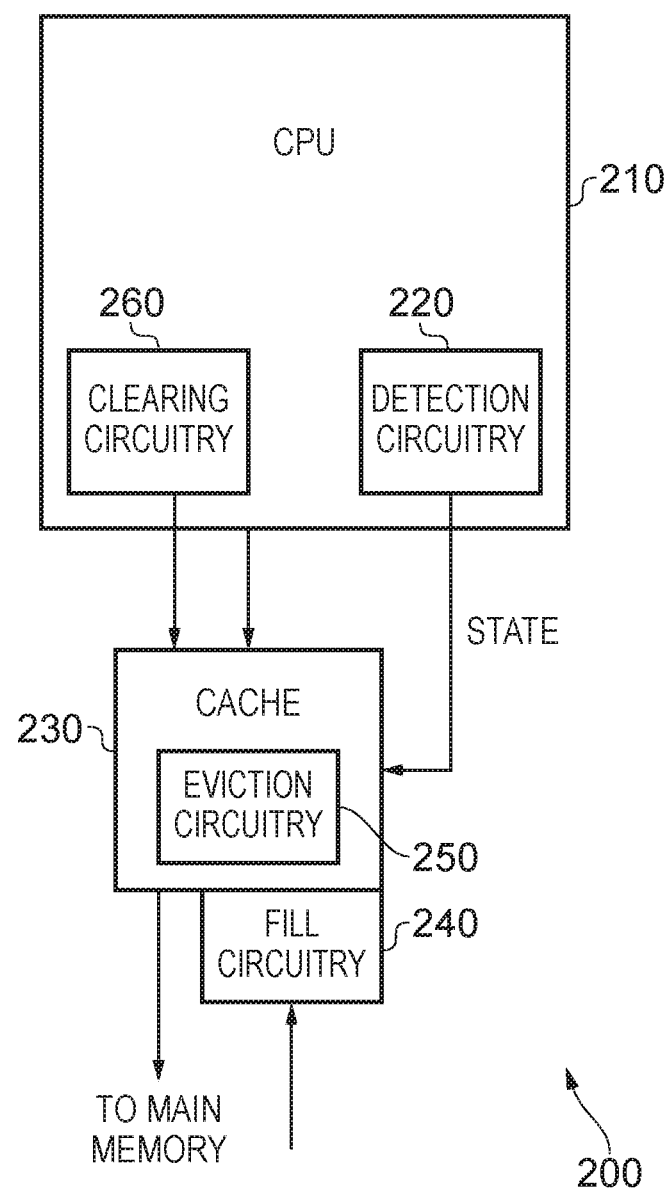
FIG. 3 illustrates an example of content of the cache in accordance with some embodiments.

FIG. 3 illustrates an example of content 300 of the cache 230. For each entry 350, 360 of the cache content 300, there is provided a state 310 that indicates whether the entry is valid or not. Here, the value 'v' indicates that the entry is valid. Such a flag can be thought of as an indicator of whether the particular entry has been deleted or not. Each entry also includes a tag 320 that is used to reference the particular entry. In this case, the tag for each of the entries 350, 360 is a program counter value marking the start of a block of instructions. The data 330 stored in relation to each entry 350, 360 is a representation of the block of instructions. In this example, each block of instructions includes four instructions. In this example, a candidate flag 340 is also provided for each entry 350, 360. Here, the candidate flag represents whether the instructions were fetched as a consequence of speculative execution. In particular, whether the instructions were speculatively fetched. In this example, a value of 'one' indicates that the instructions were speculatively fetched and therefore that the entry is a candidate for eviction if a victim must be selected. This flag may be cleared by the clearing circuitry 260 in dependence on one or more conditions. In particular, if the speculative execution of the instructions of the entry 350 turns out to be correct, then those instructions are useful for the current execution of instructions by the CPU 210 and so the candidate flag should be cleared to discourage the selection of that entry for eviction. Another example may be if the same block of instructions is speculatively fetched again. In other words, if a speculative fetching of instructions already in the cache 230 occurs, then the candidate flag 340 may also be cleared. This represents the situation in which it is more likely that the instructions are likely to be used as a consequence of having been speculatively fetched multiple times. The candidate flag 340 is therefore set based on criteria that is related to a mechanism lying outside the cache—in this case the speculative state of the CPU 210 when executing the associated instructions.

FIG. 4 illustrates an apparatus 400 for use with branch predication in accordance with some embodiments. The apparatus 400 includes fetch circuitry 405 that fetches instructions from an instruction cache 455. From here, the instructions are decoded by decode circuitry 410 into one or more operations, micro-operations, or macro-operations, or a combination thereof. The decoded "micro/macro" operations are passed to rename circuitry 415. The rename circuitry 415 can be used in order to aid speculation by removing non-real dependencies between instructions that make reference to the same logical registers. For example, an instruction in the loop may make reference to a register R3. Speculation may be performed in order to determine whether, at the end of each iteration, the loop should repeat or not. In practice, it may take a number of processor cycles to establish whether the loop should repeat or not. During this time, rather than stalling the processing circuit, the loop may repeat again. This way, if it is determined that the loop should have repeated, no delay in processing has occurred. In this case, the rename circuitry 415 will provide a different physical register to the reference to logical register R3. Consequently, if a "rewind" must occur, the old version of register R3 can be restored by simply discarding the value held in the remapped registers. The use of a different R3 register is invisible to the underlying program. In any event, whether or not renaming occurs via the rename circuitry 415, the "possibly renamed" operations are passed to issue circuitry 420. The issue circuitry 420 may comprise a number of queues for each of the execution units 430 that perform the execution. In this way, a number of different operations may be executed simultaneously and operations may potentially even be executed out-of-order. The execution units 430 in this example include an arithmetic logic unit 430A, a floating point unit 430B, a branch unit 430C and a load/store unit 430D. Each of these units makes use of data stored in registers 435. As previously explained, by virtue of the rename circuitry 415, the actual ones of the registers 435 that are accessed may be different from the logical registers referred to by the operations after decoding by the decode unit 410. In any event, the result of these operations may be written back to the registers 435 via a write back unit 440. The load/store unit 430D is responsible for accessing data values from memory 460. In practice, a memory hierarchy may be provided. In this example, the memory hierarchy includes not only the main memory 460, but also a level two cache 450, and a data cache 445. The data cache 445 is smaller and faster than the level two cache 450, which is smaller and faster than the main memory 460. Accordingly, a memory hierarchy is provided in which more recently accessed data items, or data items that are predicted to be used soon, are stored nearer the data cache 445, whilst those data values that have not been used, are not predicted to be used, or have not been used for a long time, are stored nearer to the main memory 460. In this way, it is possible to access data that is likely to be required more quickly. The level two cache 450 also supplies instructions from the main memory 460 to the instruction cache 455, which provides the instructions to the fetch circuitry 405 as previously described.

Within the execution of the program, one or more branch instructions may be encountered. The branch instructions are handled by the branch unit 430C. In particular, the branch unit 430C may be responsible for controlling a program counter, which is used to effect the instructions fetched by the fetch circuitry 405. When a branch is encountered, a branch predictor 465 may be used in order to determine the direction and the target of the branch so that instructions can continue to be fetched, decoded, renamed, issued and executed while the branch instruction is resolved by the branch unit 430C. In particular, a branch target buffer 475 is provided to aid the prediction of a target of the branch instruction. This may be of particular use with indirect branch instructions where the target of the branch instruction is not immediately determinable but must instead be calculated. A branch direction buffer 480 is provided to aid the prediction of whether a branch is to be taken or not. This may be of particular use for branch instructions that are conditional, i.e. where the branch might or might not be taken.

As previously explained, the outcome of the branch predictor 365 could be wrong. This may particularly be the case where a branch is encountered for the first time. As a consequence of an incorrect prediction by the branch predictor 465, the fetch circuitry 405 will cause instructions to be fetched into the instruction cache 455 for instructions that ultimately will be "rewound". Such occupancy of the instruction cache 455 is therefore incorrect. In particular, if it turns out that the data that has been fetched from the level two cache 450 based on the incorrect prediction by the branch predictor 465 happens to not correspond with instructions, then this will cause the instruction cache 455 to be used up by data that does not correspond with instructions. This is clearly wasteful of the instruction cache 455's limited capacity. In particular, it prevents legitimate instructions from being cached. The present technique makes it possible to overcome this problem by marking such instructions as suitable for eviction. Later, if particular conditions are met (e.g. it is determined that the instructions were validly collected) then the flag is cleared thereby reducing the probability with which the entry will be evicted. It will be appreciated that the present technique is also applicable to the data cache 445. In particular, if data is incorrectly fetched from the level two cache 450 as a consequence of instructions being miss-speculated, then the data cache 445's limited capacity will be used up by data inappropriately. In particular, when a rewind occurs, data may be stored in the data cache 445 that ought not to be there. Again, the present technique makes it possible to indicate that such data is initially suitable for eviction until such time as it is demonstrated that the data has been validly inserted. This causes such data to be preferentially selected for eviction over other data.

Figure 5:
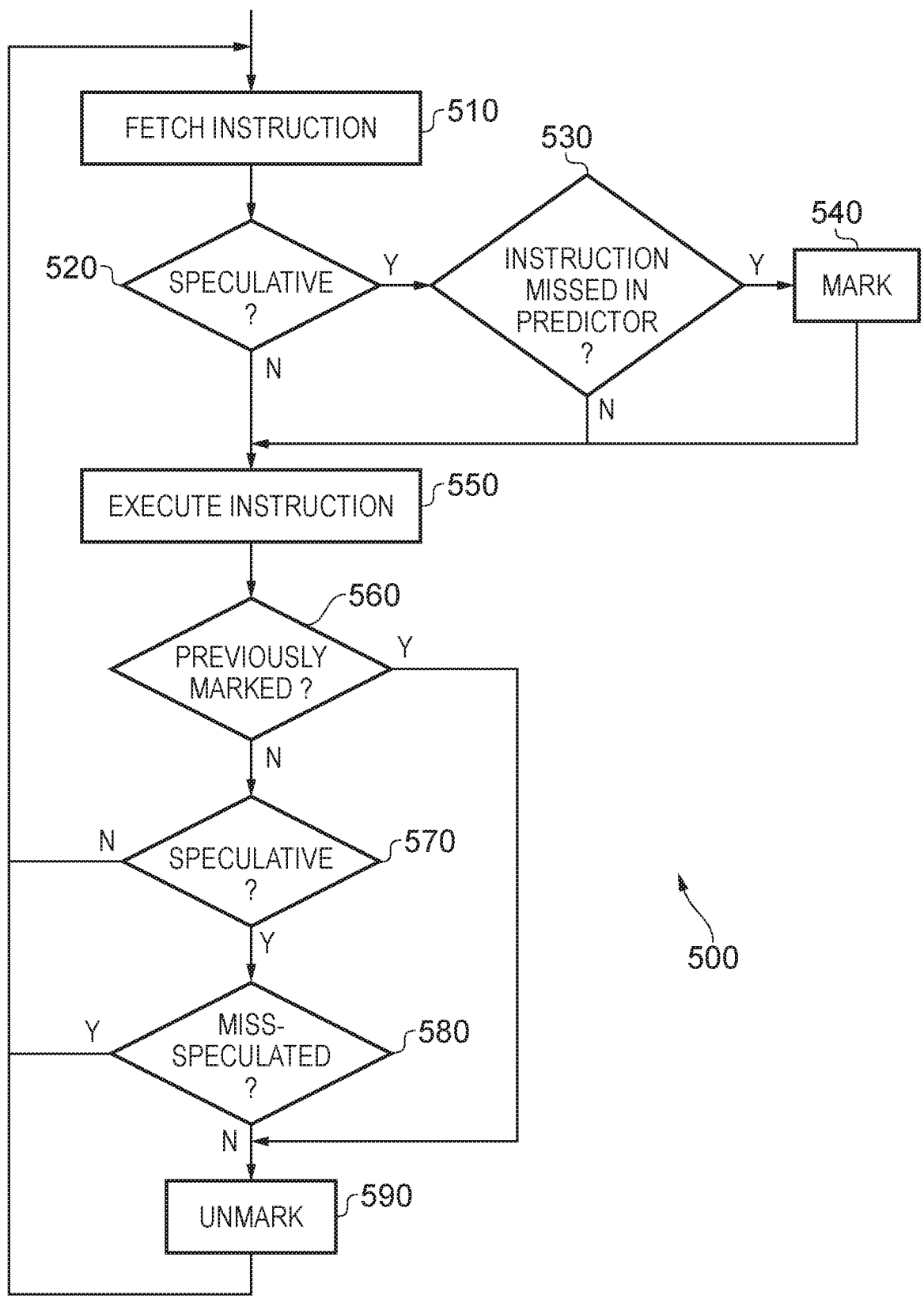
FIG. 5 illustrates a flow chart that shows the process of marking and unmarking items in a cache in accordance with some embodiments.

FIG. 5 illustrates a flow chart 500 that shows the process of marking and unmarking items in a cache in accordance with some embodiments. At a step 510, an instruction is fetched. At a step 520, it is determined whether the instruction is being executed speculatively. If not, then the process proceeds to step 550. Otherwise, the process proceeds to step 530 where it is determined whether the instruction is being speculatively executed as a consequence of a branch instruction missing in one of the branch predictor. If not, then the process proceeds to step 550. If so, then the instruction, and any associated data, is marked in the relevant caches at step 540, and the process proceeds to step 550 where the instruction is executed. This represents the principle that a speculatively executed instruction that is speculatively executed without the benefit of prediction data being available is treated as 'circumspect'. It is therefore marked as being suitable for eviction until proven to be otherwise relevant. After having executed the instruction at step 550, it is determined whether the instructions or data were previously marked. In particular, whether the instructions or data were already stored within the relevant caches and were marked. If so, then the process proceeds to step 590 where those entries in the caches are unmarked or cleared. This represents one of several conditions that can be met for clearing the indicator in the cache that an entry should be preferred for eviction. In particular, if a particular entry is repeatedly referenced, then there is a greater likelihood that the references to those instructions or data are valid and that the instructions or data will be used. Consequently, those instructions or data should not be preferentially selected for eviction. If, at step 560, the instruction or data has not been previously marked, then at step 570 it is again determined whether the instruction was executed speculatively or not. If not, then the process simply returns to step 510. If the instruction was executed speculatively, then at step 580 it is determined whether the instruction was miss-speculated. In practice, this question may not be answered immediately and may require several processor cycles to be determined. Regardless, if the instruction was executed speculatively incorrectly, then the process proceeds to step 510. Otherwise, the process proceeds to step 590 where the instruction and/or data is unmarked. This represents the second condition that may be met in order to cause an entry of one of the caches to be unmarked or cleared. In particular, if the instruction or data was correctly speculated such that the instruction or data is actively being used, then the entries in the cache are unmarked since they relate to valid instructions or data that are correctly executed. The process then proceeds from unmarking or clearing at step 590 to fetching the next instruction at step 510.

Accordingly, it is demonstrated how by marking and unmarking instructions and data based on a state of the CPU, it is possible to preferentially select entries in caches for eviction that are less likely to be useful for the current execution of instructions and data. Consequently, it is possible to make better use of the limited capacity available in the caches.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. A data processing apparatus comprising:
cache circuitry to store a plurality of items, each having an associated indicator;
processing circuitry to execute instructions using at least some of the plurality of items;
fill circuitry to insert a new item into the cache circuitry;
eviction circuitry to determine which of the plurality of items is to be a victim item based on the indicator, and to evict the victim item from the cache circuitry; and
detection circuitry to detect a state of the processing circuitry at a time that the new item is inserted into the cache circuitry, and to set the indicator in dependence on the state; and
clearing circuitry to detect a condition and in response to the condition, to clear the indicator for a cleared item in the items, wherein
the processing circuitry is adapted to execute at least some of the instructions speculatively; and
the state of the processing circuitry comprises a speculation state of the processing circuitry.

2. The data processing apparatus according to claim 1, comprising:
prediction circuitry to perform a branch lookup in respect of a branch instruction in the instructions, wherein
the speculation state is dependent on the branch lookup.

3. The data processing apparatus according to claim 2, wherein
the prediction circuitry comprises a branch target buffer;
the branch lookup is a branch target lookup in the branch target buffer; and
when the branch lookup results in a miss, the speculation state is set to indicate that the at least some of the instructions are to be executed speculatively, and the indicator is set.

4. The data processing apparatus according to claim 2, wherein
the branch instruction is a conditional branch instruction;
the prediction circuitry comprises a branch direction buffer;
the branch lookup is a branch direction lookup in the branch direction buffer; and
when the branch taken lookup results in a miss, the speculation state is set to indicate that the at least some of the instructions are to be executed speculatively, and the indicator is set.

5. The data processing apparatus according to claim 4, wherein
when the branch direction lookup results in the miss, the processing circuitry is adapted to speculatively disregard the branch.

6. The data processing apparatus according to claim 1, wherein
the condition comprises a requirement that the at least some of the instructions are speculatively executed twice while the cleared item is stored in the cache circuitry.

7. The data processing apparatus according to claim 1, wherein
the condition comprises a requirement that the instructions are executed speculatively correctly.

8. The data processing apparatus according to claim 1, wherein
the cache is an instruction cache; and
the items comprise the at least some of the instructions.

9. The data processing apparatus according to claim 8, wherein
the instructions are deadblock instructions.

10. The data processing apparatus according to claim 1, wherein
the cache is a data cache; and
the items comprise data used in execution of the instructions.

11. A data processing method comprising:
storing a plurality of items in a cache circuitry, each having an associated indicator;
executing instructions on processing circuitry using at least some of the plurality of items;
inserting a new item into the cache circuitry;
determining which of the plurality of items is to be a victim item based on the indicator;
evicting the victim item from the cache circuitry;
detecting a state of the processing circuitry at a time that the new item is inserted into the cache circuitry;
setting the indicator in dependence on the state;
detecting a condition; and
in response to detecting the condition, clearing the indicator for a cleared item in the items, wherein
at least some of the instructions are executed speculatively; and
the state of the processing circuitry comprises a speculation state of the processing circuitry.

12. A data processing apparatus comprising:
means for storing a plurality of items, each having an associated indicator;
means for executing instructions using at least some of the plurality of items;
means for inserting a new item into the means for storing;
means for determining which of the plurality of items is to be a victim item based on the indicator;
means for evicting the victim item from the cache circuitry;
means for detecting a state of the means for executing instructions at a time that the new item is inserted into the means for storing;
means for setting the indicator in dependence on the state; and
means for detecting a condition and in response to the condition, clearing the indicator for a cleared item in the items, wherein
the means for executing instructions is adapted to execute at least some of the instructions speculatively; and
the state of the means for executing instructions comprises a speculation state of the means for executing instructions.

* * * * *